United States Patent [19]

Hill

[11] 3,990,978
[45] Nov. 9, 1976

[54] BREAKING OF GELLED ORGANIC LIQUIDS

[75] Inventor: Donald G. Hill, Tulsa, Okla.

[73] Assignee: The Dow Chemical Company, Midland, Mich.

[22] Filed: June 3, 1974

[21] Appl. No.: 475,703

Related U.S. Application Data

[63] Continuation-in-part of Ser. No. 424,145, Dec. 12, 1973, abandoned.

[52] U.S. Cl. .......................... 252/8.55 R; 166/308; 252/326; 252/327
[51] Int. Cl.$^2$ ........................................ E21B 43/26
[58] Field of Search .............. 252/8.55 R, 326, 327; 166/283, 308

[56] References Cited

UNITED STATES PATENTS

| | | | |
|---|---|---|---|
| 2,596,844 | 5/1952 | Clark | 252/8.55 X |
| 2,652,370 | 9/1953 | Wisherd | 252/326 |
| 2,774,740 | 12/1956 | Magram | 252/326 |
| 2,966,457 | 12/1960 | Starmann et al. | 252/8.55 |
| 3,757,864 | 9/1973 | Crawford et al. | 166/308 |
| 3,799,267 | 3/1974 | Ely et al. | 166/308 |

*Primary Examiner*—Herbert B. Guynn
*Attorney, Agent, or Firm*—Bruce M. Kanuch

[57] ABSTRACT

The viscosity of organic liquids which contain an aluminum salt of an aliphatic orthophosphate ester viscosity improver can be reduced by incorporating into the organic liquid one or more specific chemical breakers.

15 Claims, No Drawings

BREAKING OF GELLED ORGANIC LIQUIDS

CROSS-REFERENCE TO RELATED APPLICATION

This is a continuation-in-part of application Ser. No. 424,145, filed Dec. 12, 1973, now abandoned

BACKGROUND OF THE INVENTION

U.S. Pat. No. 3,757,864, the teachings of which are specifically incorporated herein by reference, teaches that certain aluminum salts of orthophosphate esters can be employed to decrease the friction loss of and/or gel nonpolar organic liquids. It is often desirable to incorporate into gelled liquids a chemical which will effectively cause the viscosity of the liquid to decrease after a predetermined period of time. For example, in fracturing petroleum producing formations it is desirable to remove the fracturing fluid from the formation following the treatment to prevent a restriction on the flow of petroleum fluid therefrom. Gelled fluids can most often be more easily and effectively removed if the viscosity can be reduced after the formation is fractured. In other situations, for example, where solids are being transported through a pipeline as a suspension of such solids in a gelled fluid, it is desirable to reduce the viscosity of the fluid when the solids are to be removed from the liquid.

The present invention concerns the discovery of a group of chemicals which can be employed to break (cause at least a 75 per cent reduction in the maximum viscosity of the liquid) an essentially nonpolar organic liquid which is gelled with an aluminum salt of an orthophosphate ester in the manner taught in U.S. Pat. No. 3,757,864. Acids, e.g. acetic acid, hydrochloric acid and bases, e.g. amines as taught in U.S. Pat. No. 3,505,374, break these types of gels. However, the break occurs immediately which is undesirable in fracturing operations.

THE INVENTION

The present invention can be employed in processes comprising fracturing petroleum producing formations, in transporting solids via pipelines and the like. In the practice of the invention a sufficient quantity of a breaker, as defined hereinafter, is added to an organic liquid to which has also been added an aluminum salt of an aliphatic orthophosphate ester in the manner described in U.S. Pat. No. 3,757,864 (hereinafter referred to as system) to cause the viscosity of said liquid to be reduced a desirable amount within a set period of time.

Breakers which have been found useful are ones which will not cause the system to immediately break below about 70 per cent of its original viscosity at 75° F determined on a Fann Viscometer at 170 sec$^{-1}$, but which will cause the system to break to a point where the gelled system will not support, i.e. carry, particulate materials after a set period of time, e.g. when the system is returned from a borehole following a fracturing operation. Generally, if the viscosity of the system can be reduced to at least about 25 per cent of the maximum viscosity at the temperature of use, it will not be able to support, i.e. carry, a substantial amount of solids. Breakers which have been found useful are the following compounds which are soluble in the organic liquid at the temperature of the liquid when it is to be broken: the alkali and alkaline earth metal, aluminum and ammonium salts of various monocarboxylic acids, i.e. formic, acetic, propionic and benzoic acid. Specific compounds which promote the breaking of the system include sodium, potassium, lithium, calcium, magnesium, barium, ammonium and aluminum formate, acetate, propionate and benzoate. Inorganic salts also found effective are diand triammonium and di- and trialkali metal salts of phosphoric acid, e.g. diammonium phosphate, trisodium phosphate; alkali metal and ammonium carbonates and bicarbonates, alkali metal and ammonium fluorides, sodium metaborate and solid sodium aluminate. Other organic compounds found effective are organic acid anhydrides and esters, e.g. salicylic acid, acetic anhydride diethyl oxalate; dipotassium succinate, sodium salicylate, sodium n-propyl phosphate and sodium salts of 2,4-pentandione and ethyl acetoacetate. In practice the acetates have been found to be most preferred because of their function as a time delayed breaker. Preferred breakers, because of their overall consistent performance, are sodium acetate, potassium acetate, ammonium acetate, sodium benzoate, ammonium benzoate, sodium propionate, aluminum acetate, calcium acetate, sodium salicylate, sodium fluoride, potassium fluoride, sodium metaborate, sodium aluminate, sodium n-propyl phosphate, acetyl salicylic acid, ammonium carbonate and ammonium bicarbonate.

The amount of breaker to be employed will vary depending on such parameters as the temperature of gelled system at the time a break is desired, original viscosity of the system, exact aluminum salt of an aliphatic orthophosphate ester employed, the concentration of the aluminum orthophosphate ester employed and the like. The following examples demonstrate how some of these parameters effect the various breakers. Generally, an effective amount of breaker ranges from about 5 to about 100 pounds of breaker per 1000 gallons of the gelled system.

The solid breakers may be admixed with various amounts of particulate inert solid fillers which aid in dispersing and metering the breaker into the organic liquid.

EXAMPLE 1

In this and the following examples the chemicals tested as breakers were added to the system as particulate solids except as were otherwise noted.

In this example kerosene was gelled by adding an equivalent of 8 gallons per 1000 gallons of kerosene of a gelling agent comprising a mixture of 80.3 per cent by weight of the reaction product of: 53.9 per cent by weight of a mixture of octyl and decyl alcohols, 28.9 per cent by weight of phosphorous pentoxide and 17.2 per cent by weight of anhydrous ethanol; 16.7 per cent by weight of toluene and 3 per cent by weight of tall oil. The gelling agent was activated by also mixing with the kerosene an equivalent of 1.25 gallons per 1000 gallons of kerosene of a 38 per cent by weight active aqueous solution of sodium aluminate. The gelling agent defined above is hereinafter referred to as "Geller" and the aqueous solution of sodium aluminate as "Activator".

Samples of kerosene gelled by the Geller Activator were heated to various temperatures and the viscosity of the heated sample determined after reaching a temperature equilibrium with a Fann Viscometer at 300 and 100 revolutions per minute. The viscosities are set forth in the following Table I.

TABLE I

| Temperature °F | Viscosity (cps) | |
|---|---|---|
| | 300 rpm | 100 rpm |
| 80 | 70 | 150 |
| 100 | 66 | 145 |
| 125 | 62 | 140 |
| 150 | 58 | 130 |
| 175 | 53 | 120 |
| 200 | 48 | 105 |
| 225 | 42 | 75 |
| 250 | 30 | 37 | effect, if any, the organic acid salt had on the viscosity of the gelled kerosene. The viscosity of each sample was first determined prior to the addition of the chemical, immediately after a mixing time of about three minutes and again after a lapse of 1 and/or 24 hours. The viscosity is reported as per cent of the original viscosity of the kerosene gel determined prior to the addition of the chemical. The results are set forth in the following Table II.

TABLE II

| | | % Viscosity Remaining[1] | | | | | | |
|---|---|---|---|---|---|---|---|---|
| | Conc. | 75° F | | | 150° F | | 200° F | |
| Chemical Additive | Lbs/1000 Gal | Initial | 1 Hr | 24 Hr | 1 Hr | 24 Hr | 1 Hr | 24 Hr |
| Sodium formate | 20 lbs | 100.0 | 120.0 | 55.0 | 86.0 | 72.4 | 72.0 | 65.0 |
| Sodium acetate-anhydrous | 20 | 90.0 | 65.4[2] | 2.0[2] | 68.0 | 1.5 | 6.0 | 1.0 |
| Sodium acetate-trihydrate | 25 | 101.9 | 86.5 | 53.8 | 92.3 | 9.6 | 76.9 | 19.2 |
| Potassium acetate | 20 | 123.4 | 93.6 | 48.9 | 83.0 | 36.1 | 85.1 | 19.1 |
| Ammonium acetate | 20 | 100.0 | 97.2 | 63.9 | 80.6 | 45.8 | 30.6 | 2.8 |
| Calcium acetate | 20 | 101.4 | 93.1 | 66.7 | 66.7 | 67.1 | 38.9 | 2.8 |
| Barium acetate | 20 | 80.8 | 79.8[2] | 57.7[2] | 50.0 | 57.7 | 47.1 | 59.6 |
| Aluminum acetate | 20 | 86.5 | 23.1[2] | 48.1[2] | 59.6 | 53.8 | 67.3 | 1.9 |
| Sodium trichloroacetate | 25 | 115.4 | 105.8 | 51.9 | 82.7 | 69.2 | 75.0 | 28.8 |
| Sodium glycolate | 20 | 80.0 | 94.0 | 56.0 | 84.0 | 60.0 | 76.0 | 56.0 |
| Sodium propionate | 20 | 100.0 | 74.0 | 50.0 | 68.0 | 4.0 | 58.0 | 4.0 |
| Sodium benzoate | 20 | 88.1 | 71.4 | 54.8 | 66.7 | 26.2 | 31.0 | 4.8 |
| Ammonium benzoate | 20 | 104.3 | 76.6 | 48.9 | 57.4 | 42.6 | 27.7 | 4.3 |
| Sodium salicylate | 20 | 104.0 | 36.0 | 16.0 | 6.0 | 4.0 | 4.0 | 4.0 |
| Sodium stearate | 25 | 46.2 | 34.6 | 38.4 | 34.6 | 25.0 | 15.4 | 6.0 |
| Sodium tallate | 25 | 17.3 | 32.7 | 23.1 | 32.7 | 34.6 | 25.0 | 8.0 |
| Aluminum octoate | 25 | 13.0 | — | 7.0 | — | 2.0 | — | 2.0 |
| Sodium oxalate | 25 | 104.0 | 92.0 | 106.0 | 118.0 | 64.0 | 84.0 | 76.0 |
| Potassium oxalate | 20 | 100.0 | 104.1 | 102.0 | 100.0 | 97.9 | 79.2 | 83.3 |
| Sodium tartrate | 20 | 62.0 | 60.0 | 58.0 | 78.0 | 50.0 | 84.0 | 108.0 |
| Sodium citrate | 20 | 82.0 | 58.0 | 66.0 | 68.0 | 40.0 | 84.0 | 100.0 |

[1]Per cent of original gel viscosity (150 cps) Determined with Fann 35 Viscometer at 170 sec$^{-1}$
[2]Viscosity determined at 100° F rather than 75° F This data shows that at below about 225° F the gelled temperature itself has a minimal influence on the viscosity of the gelled kerosene. An additional chemical is required to further decrease the gel viscosity.

EXAMPLE 2

Various samples of kerosene were gelled with an equivalent of 8 gallons of Geller and 1.25 gallons of Activator. Also included in these samples were various organic acid salts at an equivalent concentration of 20 pounds per 1000 gallons of gel except where noted. The viscosity of the samples were determined at various temperatures and time periods to ascertain the effect, if any, the organic acid salt had on the viscosity of the gelled kerosene.

In view of the performance of the organic acid salts, additional tests were performed in the same manner as described previously employing salts of inorganic acids to determine their effectiveness as a breaker. The gel was prepared in the same manner as described immediately hereinbefore. The results are set forth in the following Table III.

TABLE III

| | | % Viscosity Remaining[1] | | | | | | |
|---|---|---|---|---|---|---|---|---|
| | Conc | 75° F | | | 150° F | | 200° F | |
| Chemical Additive | Lbs/1000 Gal | Initial | 1 Hr | 24 Hr | 1 Hr | 24 Hr | 1 hr | 24 Hr |
| Sodium carbonate | 20 lbs | 64.0 | 82.0 | 50.0 | 58.0 | 8.0 | 46.0 | 8.0 |
| Potassium carbonate | 20 | 104.2 | 110.4 | 79.2 | 112.5 | 25.0 | 83.3 | 22.9 |
| Ammonium carbonate | 20 | 68.0 | 74.8[4] | 16.5 | 1.9[4] | — | — | — |
| | 10 | 104.0 | 78.0 | 60.0 | 15.5 | 19.4 | — | — |
| Ammonium bicarbonate | 20 | 93.2 | 103.9[4] | 64.1 | 1.9[4] | — | — | — |
| | 10 | 104.0 | 108.0 | 72.0 | 25.2 | 10.7 | — | — |
| Trisodium phosphate | 20 | 102.0 | 96.0 | 72.0 | 78.0[3] | 37.0[3] | — | — |
| Mono potassium phosphate | 20 | 103.8 | 103.8 | 82.7 | 111.5 | 67.3 | 86.5 | 92.3 |
| Dipotassium phosphate | 20 | 105.8 | 103.8 | 80.7 | 101.9 | 32.7 | 58.5 | 50.9 |
| Tripotassium phosphate | 20 | 108.5 | 95.7 | 55.3 | 119.1 | 34.0 | 76.6 | 63.8 |
| Potassium fluoride | 20 | 75.0 | 93.8 | 77.1 | 72.9 | 60.4 | 54.2 | 25.0 |
| Sodium fluoride | 20 | 88.0 | 98.0 | 55.0 | 86.0[3] | 42.0[3] | — | — |
| Sodium metaborate | 20 | 76.9 | 71.2 | 19.2[2] | 27.9 | 13.5 | 42.0 | 12.5 |
| Sodium aluminate | 20 | 80.7 | 103.8 | 19.2[2] | 32.7 | 21.2 | 48.1 | 30.8 |

[1]Per cent of original gel viscosity (150 cps) Determined with Fann 35 Viscometer at 170 sec$^{-1}$
[2]Viscosity determined at 100° F
[3]Viscosity determined at 175° F
[4]Viscosity determined at 2.0 hours rather than 1.0 hr

EXAMPLE 3

Gelled kerosene samples were prepared in the same manner as the previous tests. Various chemicals were employed in the gel at a concentration equivalent to 50 pounds of chemical per 1000 gallons of gelled kerosene. The results are set forth in the following Table IV.

TABLE IV

| Chemical Additive | Conc lbs/1000 Gal | % Viscosity Remaining[1] | | | | | | |
|---|---|---|---|---|---|---|---|---|
| | | 75° F | | | 150° F | | 200° F | |
| | | Initial | 1 Hr | 24 Hr | 1 Hr | 24 Hr | 1 Hr | 24 Hr |
| Sodium formate | 50 lbs | 54.0 | — | 54.0 | — | 62.0 | — | 22.0 |
| Calcium formate | 50 | 96.0 | — | 82.0 | — | 84.0 | — | 72.0 |
| Barium acetate | 50 | 90.0 | — | 65.0 | — | 44.0 | — | 19.0 |
| Cupric acetate | 50 | 68.0 | — | 70.0 | — | 72.0 | — | 128.0 |
| Sodium glycolate | 50 | 130.4 | 89.1 | 84.7 | 91.3 | 73.9 | — | — |
| Disodium oxalate | 50 | 94.5 | 98.1 | 87.2 | 105.4 | 67.2 | — | — |
| Diammonium oxalate | 50 | 108.5 | 94.9 | 57.6 | 94.9 | 54.2 | — | — |
| Dipotassium succinate | 50 | 80.4 | 73.9 | 32.6 | 65.2 | 19.5 | — | — |
| Disodium tartrate | 50 | 82.0 | — | 68.0 | — | 58.0 | — | 68.0 |
| Trisodium citrate | 50 | 96.0 | — | 62.0 | — | 60.0 | — | 98.0 |
| Ammonium citrate (Di) | 50 | 111.9 | 101.6 | 74.5 | 98.3 | 49.1 | — | — |
| Sodium chloride | 50 | 92.8 | 104.0 | 122.4 | 120.4 | 102.0 | — | — |
| Sodium fluoride | 50 | 57.1 | 67.3 | 42.8 | 63.2 | 18.3 | — | — |
| Sodium bicarbonate | 50 | 110.2 | 72.8 | 47.4 | 67.7 | 6.7 | — | — |
| Sodium carbonate | 50 | 110.7 | 98.3 | 77.9 | 103.3 | 30.5 | — | — |
| Diammonium phosphate | 50 | 110.2 | 93.2 | 69.4 | 109.8 | 32.2 | — | — |
| Trisodium phosphate | 50 | 106.8 | 50.8 | 47.4 | 57.6 | 18.6 | — | — |

[1]Per cent of original gel viscosity (150 cps) determined with Fann 35 Viscometer at 170 sec$^{-1}$

COMPARATIVE TESTS are ineffective due to the rapid break and/or gel reformation which results.

TABLE V

| Chemical Additive | Conc. Lbs/1000 Gal | % Viscosity Remaining[1] | | | | |
|---|---|---|---|---|---|---|
| | | 75° F | | | 150° F | |
| | | Initial | 1 Hr | 24 Hr | 1 Hr | 24 Hr |
| Liquid glacial acetic acid | 10.5 lbs | 56.0 | 82.0 | 90.0 | 60.0 | 56.0 |
| | 50 | 10.8 | 18.3 | 28.5 | 4.1 | 24.5 |
| Benzoic acid | 10.5 | 69.8 | 73.6 | 80.0 | 52.8 | 47.2 |
| | 50 | 17.4 | 41.3 | 45.6 | 26.0 | 23.9 |
| Salicylic acid | 10.5 | 8.5 | 8.5 | 19.1 | — | — |
| | 50 | 7.2 | 7.2 | 5.4 | 5.4 | 3.6 |
| Formic acid (90% active aqueous solution) | 10.5 | 25.0 | 53.8 | 96.2 | — | — |
| Propionic acid (liquid) | 10.5 | 88.5 | 88.5 | 92.3 | — | — |
| Phosphoric acid (85% active aqueous solution) | 10.5 | 53.8 | 76.9 | 26.9 | — | — |
| Hydrofluoric acid (52% active aqueous solution) | 10.5 | 3.8 | 3.8 | 3.8 | — | — |
| Oxalic acid | 50 | 81.8 | 87.2 | 78.1 | 72.7 | 43.6 |
| Succinic acid | 50 | 108.7 | 123.9 | 86.9 | 121.7 | 100.0 |
| Tartaric acid | 50 | 39.6 | 60.8 | 93.4 | 19.5 | 63.0 |
| Glycolic acid | 50 | 43.5 | 56.5 | 102.1 | 63.0 | 76.0 |
| p-Hydroxy benzoic acid | 50 | 93.5 | 97.8 | 123.9 | 97.8 | 123.9 |
| Ethylenediaminetetraacetic acid | 50 | 93.5 | 104.3 | 93.4 | 108.6 | 115.2 |

[1]Per cent of original gel viscosity determined with Fann 35 Viscometer at 170 sec$^{-1}$ In the same manner as described for the previous tests, certain acids were tested as breakers for kerosene gelled in the same manner as in the previous tests. The acids were employed at a concentration equivalent to 50 or 10.5 pounds per 1000 gallons of gelled kerosene. The tests were conducted at 75° F and 150° F. The tests are set forth in the following Table V. As shown, acids

EXAMPLE 4

In the same manner as described in the previous examples certain other chemicals were tested as breakers for gelled kerosene which was gelled in the same manner as described in the previous examples. The results of these tests are set forth in the following Table VI.

TABLE VI

| Chemical Additive | Conc. Lbs/1000 Gal | % Viscosity Remaining[1] | | | | | | |
|---|---|---|---|---|---|---|---|---|
| | | 75° F | | | 150° F | | 200° F | |
| | | Initial | 1 Hr | 24 Hr | 1 Hr | 24 Hr | 1 Hr | 24 Hr |
| Ethyl acetate | 80.0 | 102.0 | 102.0[2] | 44.0 | 82.0[2] | 92.0 | 75.0[2] | 27.0 |
| Diethyl oxalate | 40 | 63.0 | 71.7 | 32.6 | 73.9 | 4.3 | — | — |
| Dimethyl oxalate | 40 | 91.5 | 85.1 | 80.9 | 95.7 | 14.9 | 55.3 | 4.3 |
| Butyl benzoate | 40 | 100.0 | 97.8 | 91.5 | 95.7 | 100.0 | 91.5 | 12.8 |
| Methyl formate | 40 | 100.0 | 93.6 | 91.5 | 102.1 | 102.1 | 80.9 | 36.2 |
| Butyl formate | 40 | 102.1 | 93.6 | 85.1 | 97.9 | 74.5 | 87.2 | 91.5 |
| Isoamyl acetate | 125 | 106.0 | 109.0 | 42.0 | 96.0 | 60.0 | 82.0 | 62.0 |
| Acetyl salicylic acid | 20 | 100.0 | 113.3 | 64.4 | 86.7 | 20.0 | 11.1 | 4.4 |
| Acetic anhydride | 40 | 98.0 | 68.0[2] | 32.0 | 10.0[2] | — | — | — |
| Succinamide | 25 | 98.0 | 110.0 | 84.0 | 86.0 | 82.0 | 42.0 | 50.0 |
| Sodium n-propyl phosphate | 10.5 | 127.0 | 51.0 | 12.8 | 27.7 | 10.6 | — | — |
| Ethyl acetoacetate | 10.5 | 94.0 | 104.0 | 80.0 | 90.0 | 70.0 | — | — |
| Sodium salt of ethyl acetoacetate | 10.5 | 114.9 | 53.2 | 31.9 | 48.9 | 23.4 | — | — |
| 2,4-Pentandione | 10.5 | 82.0 | 88.0 | 86.0 | 70.0 | 36.0 | — | — |
| Sodium salt of 2,4-pent- | | | | | | | | |

TABLE VI-continued

| | Conc. | % Viscosity Remaining[1] | | | | | | |
|---|---|---|---|---|---|---|---|---|
| | | 75° F | | | 150° F | | 200° F | |
| Chemical Additive | Lbs/1000 Gal | Initial | 1 Hr | 24 Hr | 1 Hr | 24 Hr | 1 Hr | 24 Hr |
| andione | 10.5 | 100.0 | 68.1 | 27.7 | 29.8 | 21.3 | — | — |

[1] Per cent viscosity of original gel (150 cps) determined with Fann 35 Viscometer at 170 sec$^{-1}$
[2] Viscosity determined after 2 hours

EXAMPLE 5

In this example the effect of a 50/50 weight mixture of sodium acetate on the viscosity of gelled kerosene and gelled No. 2 diesel oil was determined at various temperatures and employing various amounts of Geller and Activator. The results for the tests run on gelled kerosene are set forth in Table VII and for gelled diesel oil in Table VIII.

TABLE VII

| | Concentration | | | Original[1] Gel | % Viscosity Remaining | | | | |
|---|---|---|---|---|---|---|---|---|---|
| Temp °F | Geller Gal/1000 Gal | Activator Gal/1000 Gal | Breaker Lb/1000 Gal | Viscosity cps | Initial % | 1 Hr % | 3 Hrs % | 5 Hrs % | 24 Hrs % |
| 75 | 8.0 | 1.20 | 35 | 150 | 106.0 | 72.0 | 28.0 | 22.0 | 8.0 |
| | | | 40 | 150 | 96.0 | 68.0 | 26.0 | 20.0 | 6.0 |
| | 8.0 | 1.25 | 30 | 156 | 94.2 | 75.0 | 44.2 | 25.0 | 17.3 |
| | | | 35 | 156 | 101.9 | 65.4 | 58.3 | 51.9 | 25.0 |
| | | | 40 | 156 | 96.2 | 65.4 | 36.5 | 26.9 | 7.7 |
| | 8.0 | 1.30 | 35 | 150 | 94.0 | 76.0 | 52.0 | 36.0 | 12.0 |
| | | | 40 | 150 | 96.0 | 74.0 | 34.0 | 22.0 | 8.0 |
| 125 | 8.0 | 1.20 | 25 | 150 | 106.0 | 75.0 | 34.0 | 8.0 | 4.0 |
| | | | 30 | 150 | 102.0 | 82.0 | 8.0 | 8.0 | 6.0 |
| | 8.0 | 1.25 | 25 | 156 | 101.9 | 73.1 | 50.0 | 17.3 | 7.7 |
| | | | 30 | 156 | 103.8 | 75.0 | 36.5 | 7.7 | 5.8 |
| | 8.0 | 1.30 | 25 | 150 | 96.0 | 82.0 | 52.0 | 10.0 | 8.0 |
| | | | 30 | 150 | 88.0 | 82.0 | 28.0 | 6.0 | 6.0 |
| 150 | 8.0 | 1.20 | 20 | 150 | 120.0 | 80.0 | 16.0 | 6.0 | 4.0 |
| | | | 25 | 150 | 110.0 | 80.0 | 8.0 | 6.0 | 4.0 |
| | 8.0 | 1.30 | 20 | 150 | 90.0 | 82.0 | 26.0 | 10.0 | 6.0 |
| | | | 25 | 150 | 100.0 | 80.0 | 10.0 | 4.0 | 4.0 |
| 175 | 8.0 | 1.20 | 15 | 150 | 108.0 | 78.0 | 24.0 | 16.0 | 10.0 |
| | | | 20 | 150 | 102.0 | 72.0 | 12.0 | 8.0 | 6.0 |
| | 8.0 | 1.25 | 15 | 156 | 96.2 | 62.3 | 61.5 | 36.5 | 17.3 |
| | | | 20 | 156 | 98.1 | 69.2 | 13.5 | 9.6 | 7.7 |
| | 8.0 | 1.30 | 15 | 150 | 88.0 | 84.0 | 32.0 | 16.0 | 12.0 |
| | | | 20 | 150 | 92.0 | 82.0 | 14.0 | 10.0 | 10.0 |
| 200 | 8.0 | 1.20 | 15 | 150 | 114.0 | 48.0 | 16.0 | 8.0 | 6.0 |
| | | | 20 | 150 | 114.0 | 28.0 | 8.0 | 4.0 | 2.0 |
| | 8.0 | 1.30 | 15 | 150 | 100.0 | 54.0 | 12.0 | 4.0 | 2.0 |
| | | | 20 | 150 | 92.0 | 30.0 | 8.0 | 4.0 | 2.0 |

[1] Viscosity at 170 sec$^{-1}$ determined with Fann 35 Viscometer

TABLE VIII

| | Concentration | | | Original[1] Gel | Viscosity Remaining vs Time | | | | |
|---|---|---|---|---|---|---|---|---|---|
| Temp °F | Geller Gal/1000 Gal | Activator Gal/1000 Gal | Breaker Lb/1000 Gal | Viscosity cps | Initial % | 1 Hr % | 3 Hrs % | 5 Hrs % | 24 Hrs % |
| 75 | 10.0 | 1.50 | 45 | 195 | 124.6 | 100.0 | 80.0 | 63.1 | 27.7 |
| | | | 50 | 195 | 126.2 | 92.3 | 70.8 | 58.5 | 21.5 |
| | 10.0 | 1.55 | 50 | 195 | 107.7 | 92.3 | 41.5 | 30.8 | 9.7 |
| | | | 60 | 195 | 110.8 | 73.8 | 26.2 | 18.5 | 4.6 |
| | 10.0 | 1.60 | 45 | 195 | 120.0 | 86.2 | 80.0 | 53.8 | 24.6 |
| | | | 50 | 195 | 112.3 | 86.2 | 61.5 | 58.5 | 18.5 |
| 100 | 10.0 | 1.50 | 40 | 195 | 113.8 | 89.2 | 41.5 | 16.9 | 4.6 |
| | | | 45 | 195 | 113.8 | 87.7 | 40.0 | 13.8 | 4.6 |
| | 10.0 | 1.60 | 40 | 195 | 101.5 | 87.7 | 58.5 | 29.2 | 6.2 |
| | | | 45 | 195 | 106.2 | 83.1 | 44.6 | 13.8 | 4.6 |
| 125 | 10.0 | 1.50 | 35 | 195 | 130.8 | 96.9 | 36.9 | 10.8 | 4.6 |
| | | | 40 | 195 | 130.8 | 93.8 | 27.7 | 7.7 | 4.6 |
| | 10.0 | 1.60 | 35 | 195 | 107.7 | 87.7 | 66.2 | 16.9 | 7.7 |
| | | | 40 | 195 | 106.2 | 87.7 | 47.7 | 10.8 | 6.2 |
| 150 | 10.0 | 1.50 | 25 | 195 | 106.2 | 98.5 | 50.8 | 15.4 | 9.7 |
| | | | 30 | 195 | 116.9 | 104.6 | 33.8 | 9.7 | 6.2 |
| | 10.0 | 1.60 | 25 | 195 | 107.7 | 103.1 | 64.6 | 16.9 | 9.7 |
| | | | 30 | 195 | 113.8 | 98.5 | 41.5 | 10.8 | 6.2 |
| 175 | 10.0 | 1.50 | 15 | 195 | 107.7 | 100.0 | 55.4 | 33.8 | 16.9 |
| | | | 20 | 195 | 98.6 | 95.4 | 29.2 | 29.2 | 9.7 |
| | 10.0 | 1.55 | 20 | 195 | 103.1 | 98.5 | 30.8 | 13.8 | 9.7 |
| | | | 25 | 195 | 103.1 | 98.5 | 18.5 | 9.7 | 7.7 |
| | 10.0 | 1.60 | 15 | 195 | 93.8 | 104.6 | 73.8 | 46.2 | 23.1 |
| | | | 20 | 195 | 100.0 | 98.5 | 49.2 | 23.1 | 10.8 |
| 200 | 10.0 | 1.50 | 15 | 195 | 98.6 | 80.0 | 30.8 | 16.9 | 9.7 |
| | | | 20 | 195 | 98.6 | 93.8 | 18.5 | 10.8 | 6.2 |
| | 10.0 | 1.60 | 15 | 195 | 107.7 | 93.8 | 29.2 | 15.4 | 9.7 |

TABLE VIII-continued

| Temp °F | Concentration Geller Gal/1000 Gal | Activator Gal/1000 Gal | Breaker Lb/1000 Gal | Original[1] Gel Viscosity cps | Viscosity Remaining vs Time Initial % | 1 Hr % | 3 Hrs % | 5 Hrs % | 24 Hrs % |
|---|---|---|---|---|---|---|---|---|---|
| | | | 20 | 195 | 109.2 | 58.5 | 15.4 | 7.7 | 6.2 |

[1] Viscosity at 170 sec$^{-1}$ determined with Fann 35 Viscometer

EXAMPLE 6

The ability of a 40/60 weight per cent mixture of ammonium bicarbonate and silica flour to break gelled kerosene gelled according to the procedure of Example 1 was determined. The results are set forth in the following Table IX.

TABLE IX

| Temp °F | Concentration Lbs/1000 Gal | Original[1] Gel Viscosity cps | % Viscosity Remaining Initial % | 1 Hr % | 2 Hrs % | 4 Hrs % | 22 Hrs % |
|---|---|---|---|---|---|---|---|
| 100 | 25 | 150 | 102.0 | 94.0 | 74.0 | 54.0 | 38.0 |
| | 30 | 150 | 98.0 | 84.0 | 60.0 | 70.0 | 28.0 |
| | 35 | 150 | 68.0 | 92.0 | 54.0 | 52.0 | 24.0 |
| 125 | 25 | 150 | 106.0 | 82.0 | 54.0 | 26.0 | 14.0 |
| | 30 | 150 | 92.0 | 80.0 | 52.0 | 26.0 | 14.0 |
| 175 | 15 | 150 | 104.0 | 50.0 | 26.0 | 34.0 | 34 |
| | 20 | 150 | 104.0 | 28.0 | 22.0 | 22.0 | 28 |
| | 25 | 150 | 100.0 | 10.0 | 9.0 | 12.0 | — |

[1] Viscosity at 170 sec$^{-1}$ determined with Fann 35 Viscometer

What is claimed is:

1. A method of reducing the viscosity of a nonpolar organic liquid containing an aluminum salt of an aliphatic orthophosphate ester as a viscosity increaser which comprises:
   adding to said organic liquid a breaker selected from the group consisting of the alkali metal, ammonium, and aluminum salts of formic, acetic, propionic and benzoic acids calcium and barium acetates trisodiums phosphate; alkali metal, and ammonium carbonates; alkali metal and ammonium bicarbonates; alkali metal and ammonium fluoride; , acetyl salicylic acid, acetic anhydride, diethyl oxalate, dipotassium succinate; sodium salicylate, sodium metaborate, solid sodium aluminate, sodium n-propyl phosphate and sodium salts of ethyl acetoacetate and 2,4-pentanedione, said breaker being soluble in the organic liquid at the temperature of the liquid when it is to be broken and being employed in an amount sufficient to reduce the viscosity of the organic liquid to an amount which is about 25 per cent or less of the maximum viscosity of the organic liquid at the maximum temperature of use of said organic liquid and which does not immediately break the viscosity of the organic liquid to below about 70 per cent of its original viscosity.

2. The method of claim 1 wherein the breaker is an alkali metal, or ammonium acetate.

3. The method of claim 1 wherein the breaker is sodium acetate.

4. The method of claim 1 wherein the breaker is sodium acetate, potassium acetate, sodium benzoate, sodium propionate, aluminum acetate, sodium salicylate, calcium acetate, sodium fluoride, potassium fluoride, sodium metaborate, sodium aluminate, sodium n-propyl phosphate, acetyl salicylic acid, ammonium carbonate and ammonium bicarbonate.

5. The method of claim 4 wherein the breaker is a combination of the breaker and an inert particulate carrier solid.

6. The method of claim 1 wherein the organic liquid is a fracturing fluid and the breaker is sodium, potassium, lithium, calcium, magnesium, aluminum or ammonium acetate, propionate, or benzoate.

7. The method of claim 6 wherein the breaker is sodium acetate.

8. The method of claim 6 wherein the breaker is potassium or lithium acetate.

9. The method of claim 6 wherein the breaker is a mixture of said breaker and an inert particulate carrier solid.

10. The method of claim 6 wherein the aluminum salt of an aliphatic orthophosphate ester is present in an amount ranging from about 40 to about 400 pounds per 1000 gallons of organic liquid.

11. The method of claim 10 wherein the breaker is sodium, potassium or lithium acetate.

12. The method of claim 10 wherein the breaker is sodium acetate in an amount ranging from about 5 to about 100 pounds per 1000 gallons of organic liquid.

13. A method of fracturing a subterranean formation with nonpolar organic liquid which contains an aluminum salt of an aliphatic orthophosphate ester as a viscosity increaser wherein the organic liquid is introduced through a borehole penetrating said formation at sufficient pressure to fracture the formation said organic liquid being recovered from said formation and borehole following said fracturing the improvement which comprises:
   including in said organic liquid a chemical selected from the group consisting of the alkali metal, ammonium, and aluminum salts of formic, acetic, propionic and benzoic acids calcium and barium acetates trisodium phosphate; alkali metal, and ammonium carbonates; alkali metal and ammonium bicarbonates; alkali metal and ammonium fluoride; acetyl salicylic acid, acetic anhydride, diethyl oxalate, dipotassium succinate, sodium salicylate, sodium metaborate, solid sodium aluminate, sodium n-propyl phosphate and sodium salts of ethyl acetoacetate and 2,4-pentanedione, said breaker being soluble in the organic liquid at the temperature of the liquid when it is to be broken and being employed in an amount sufficient to reduce the viscosity of the organic liquid to an amount which is about 25 per cent or less of the maximum viscosity of the organic liquid at the maximum temperature of use of said organic liquid and which does not immediately break the viscosity of the organic liquid to below about 70 per cent of its original viscosity.

14. The method of claim 13 wherein the chemical is sodium acetate.

15. The method of claim 13 wherein the chemical is sodium acetate, potassium acetate, sodium benzoate, sodium propionate, aluminum acetate, sodium salicylate, calcium acetate, sodium fluoride, potassium fluoride, sodium metaborate, sodium aluminate, sodium n-propyl phosphate, acetyl salicylic acid, ammonium carbonate and ammonium bicarbonate.

* * * * *

UNITED STATES PATENT OFFICE
CERTIFICATE OF CORRECTION

PATENT NO. : 3,990,978
DATED : Nov. 9, 1976
INVENTOR(S) : Donald G. Hill

It is certified that error appears in the above-identified patent and that said Letters Patent are hereby corrected as shown below:

Column 1, line 17, delete "producting" and insert --producing--;
Column 2, line 6, delete "diand" and insert --di- and--;
Column 2, line 12, after "e.g." insert --acetyl--;
Column 9, Claim 1, line 40, after "tates" insert --;-- and delete "s" from the word "trisodium";
line 39, after "acids" insert --;--;
line 43, beginning of line, delete ",";

Column 10, Claim 13, line 59, insert --;-- after "acids;
line 60, insert --;-- after "acetates".

Signed and Sealed this

Fifteenth Day of March 1977

[SEAL]

Attest:

RUTH C. MASON
Attesting Officer

C. MARSHALL DANN
Commissioner of Patents and Trademarks